Figure 1A:
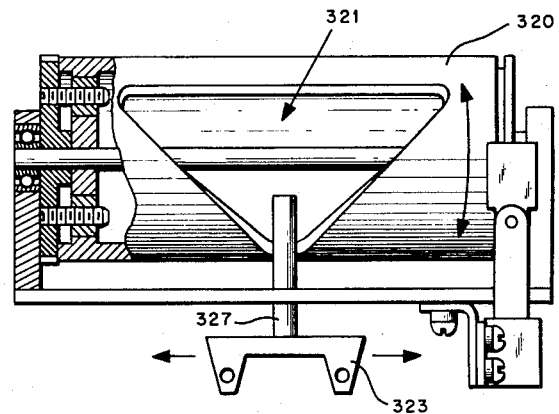

May 24, 1960  C. E. GALLAGHER  2,937,531
GYROSCOPE CAGING MECHANISM
Original Filed July 24, 1953  2 Sheets-Sheet 1

INVENTOR.
CHARLES E. GALLAGHER
BY
AGENT

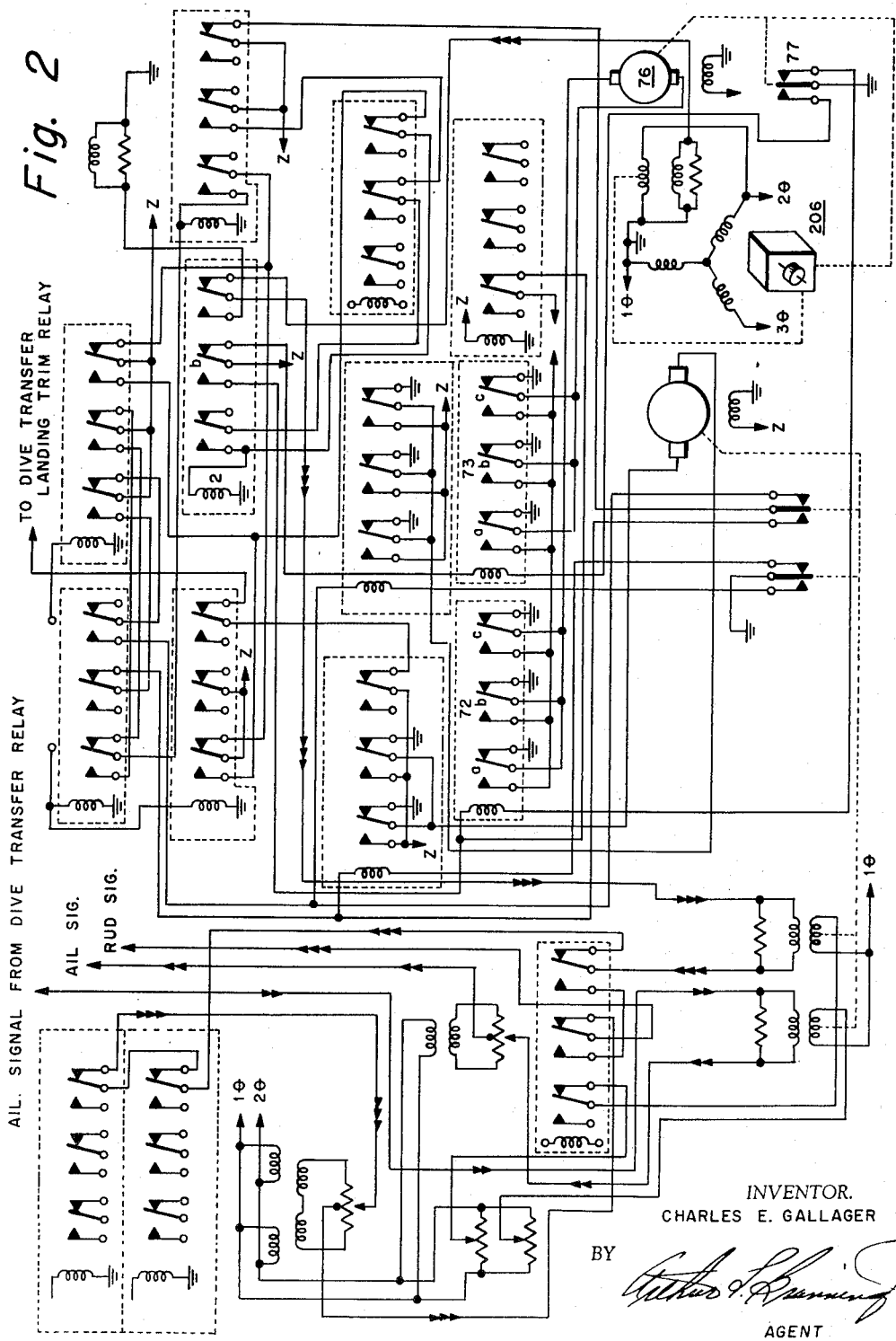

united States Patent Office 2,937,531
Patented May 24, 1960

2,937,531

GYROSCOPE CAGING MECHANISM

Charles E. Gallagher, Yale Hill, Box 322,
Stockbridge, Mass.

Original application July 24, 1953, Ser. No. 370,238. Divided and this application June 4, 1958, Ser. No. 739,953

6 Claims. (Cl. 74—5.1)

(Granted under Title 35, U.S. Code (1952), sec. 266)

The invention herein described may be manufactured and used by or for the Government of the United States of America for governmental purposes without the payment of any royalties thereon or therefor.

This application is a division of application Serial No. 370,238 of Charles E. Gallagher and Robert B. Eaves for Remote Control System for Aircraft filed July 24, 1953.

The present invention relates to a gyroscope caging mechanism and more particularly to a gyroscope caging mechanism for use in highly maneuverable remotely controlled aircraft.

Caging devices of various types are recognized in the art as desirable ancillary means for caging or immobilizing under certain conditions gyroscopic instrumentalities employed for control of a vehicle. While the devices of the prior art are generally suitable for the purpose intended, they possess certain inherent and undesirable limitations which preclude their application to drone aircraft of a highly maneuverable type. The operation of such an aircraft presents operating conditions which are unique, necessitating special caging means.

Accordingly, the inventive gyroscope caging mechanism overcomes the limitations of the devices of the prior art by providing an embodiment comprised essentially of a rotatable cylinder having a triangularly shaped opening therein, and a suitably controlled rotary driving means therefor. The caging arm of a gyroscope is inserted within the opening for lateral movement within the arbitrary angular limits subtended by an apex of the triangularly shaped opening, and for limited transverse movement during engagement with a caging pin of the gyroscope. Upon receipt of an appropriate remote command signal, the driving means is energized, causing rotation of the cylinder, driving it to one of two limit positions, either caged or uncaged. Thus, in the manner summarily set forth, the instant invention presents a novel gyroscope caging mechanism of a type particularly applicable to remotely controlled aircraft.

An object of the present invention is the provision of a gyroscope caging mechanism for caging a gyroscope upon receipt of an appropriate remote command signal.

Another object is to provide caging of a gyroscope in which sizable angular displacement has resulted between inner and outer gimbals thereof.

A further object of the invention is the provision of a gyroscope caging mechanism for caging a gyroscope irrespective of the instantaneous flight attitude of an aircraft to effect return of the aircraft to a datum flight attitude.

Still another object is to provide a gyroscope caging mechanism which is responsive upon appropriate remote command signals to effect gradual caging of a gyroscope without disengagement of the automatic pilot system incorporated in a drone aircraft so that return of the aircraft to a datum flight attitude may be implemented without violent transitionary maneuvers.

An additional object of the present invention is the provision of a gyroscope caging mechanism which is responsive to a remote caging command signal to centralize gradually the gimbals of a gyroscope without disengagement of the automatic pilot system effecting thereupon positive locking of the gimbals, and upon receipt of a remote uncaging command signal the gyroscope caging mechanism effects uncaging of the gimbals of the gyroscope to allow normal functioning of the gyroscope.

Figure 1B:
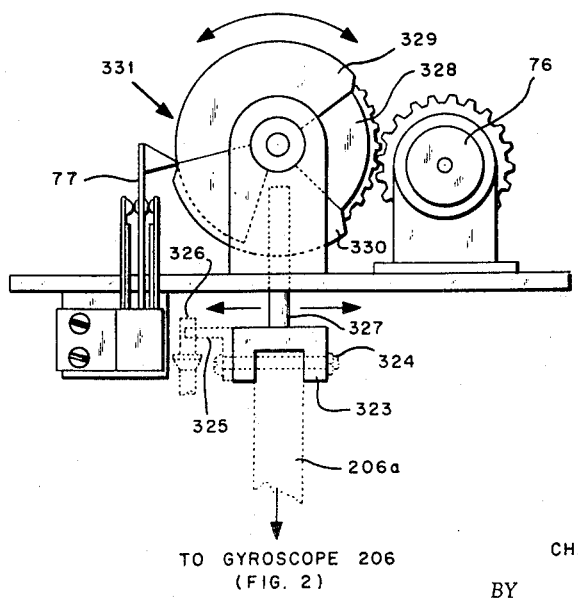

The exact nature of this invention as well as other objects and advantages thereof will be readily apparent upon consideration of the following specification relating to the annexed drawing in which:

Fig. 1a and Fig. 1b are elevation and end views, respectively, of a preferred embodiment of the gyroscope caging mechanism, and Fig. 2 is a detailed schematic electrical diagram of a portion of the turn circuits of a remotely controlled aircraft, the electrical control circuit of the inventive gyroscope caging mechanism being embodied with the turn circuits as a functional part thereof.

Electrical elements illustrated in the drawing without numerals are discussed in detail in the parent application and are not essential to the present invention except to the extent that they complete the electrical circuits connected to the caging mechanism.

Referring now to the drawings, wherein like reference characters designate like or corresponding parts throughout the several views, there is shown in Fig. 1a a cylindrical drum 320, having a generally triangular aperture 321. The lower apex as shown, subtends an angle of approximately 60°, permitting a freedom in yaw of about plus or minus 30°. An aperture engaging pin 327 is disposed for lateral translation, as indicated by the arrows, within the angular limits set above and also in a direction perpendicular to this translation as shown by the arrows in the view of Fig. 1b. A conventional caging arm 206a of a gyroscope 206 (Fig. 2) has fitted thereon an adapting yoke 323. A bolt 324 extending through the free end of caging arm 322 and adapting yoke 323 holds caging cam 325, which is so shaped that it readily engages with pin 326 and prevents any motion of the inner gimbals with respect to the outer gimbals of directional gyroscope 206. Caging cam 325 is a conventional cam member normally supplied as a part of the manual caging assembly of the directional gyroscope of an automatic pilot of the type previously noted, for enabling manual caging thereof. A reversible direct current motor 76 imparts direct rotation of the cylindrical drum 320 through the aid of suitably interposed gears in response to energization of either of relays 72 or 73, as illustrated in Fig. 2, operable to effect rotation of the motor 76. Switch 77 is a limit switch effective to terminate rotation upon completion of the engagement or disengagement of pin 326 with caging cam 325. The cam 331 may comprise an adjustable superimposed pair of raised sectors 329 and 330. Slots and tightening bolts (not shown) may serve to hold the cam sectors 329 and 330 in adjustably fixed position with respect to one another, and in relative position with the drum 320. Fig. 1b portrays an exposed end portion 328 of the drum which provides the support for the cam sectors. Switch 77 is maintained closed as indicated in Fig. 1b so long as the armature member of this switch is disposed to ride on an arcuate surface of constant radius. At the arcuate extremities of this surface on cam 329 are slopes having opposing inclinations which are effective to thus break either contact of switch 77 with the armature contact member, as appropriate.

The operation of the directional gyroscope caging mechanism can best be seen with reference to the combined showing thereof in the drawing. The caging mechanism is portrayed in the caged position, the engaging pin 327 resting in the lower apex of the triangular aperture 321. The force necessary for forceable engagement or disengagement of caging cam 325 and caging pin 326 is derived from the torque imparted to the cylindrical drum 320 by motor 76. Assuming that the mechanism is uncaged, the triangular aperture will have rotated so that the side opposite the lower apex will be adjacent rod 327, which is disposed in this position of cylindrical drum 320 for unrestricted lateral movement in the widest portion of the aperture within the imposed plus or minus 30° angular limits. Caging cam 325 will of course have been disengaged concurrently from caging pin 326. Upon receipt of a turn signal, contact 2b will be closed to the energized position providing connection with a 24 volt D.C. source Z to relay 72 shown in Fig. 2, through the appropriately closed contacts of switch 77 to ground. Contacts 72a–b–c shown in Fig. 2 provide for excitation of motor 76, which begins to turn. If rod 327 is asymmetrically disposed within the aperture, it will travel laterally as indicated by the arrows in Fig. 1a in sliding contact engagement with a triangular edge of the aperture of drum 320 until the rod is centered at the lower apex. The above operation will realign the spin axis of the directional gyroscope coincident with the lateral axis of the aircraft, or with a predetermined compass course as would be performed in manual caging. Concurrently with the arrival of engaging pin support rod 327 at the lower apex of the aperture 321, caging cam 325 is forcibly engaged with caging pin 326 by application of a force transmitted clockwise of the device as shown in Fig. 1b to rod 327 at the point of the lower apex, and in addition, the armature member of limit switch 77 begins to rise along the end slope of cam 330, breaking contact and deenergizing relay 72, which removes excitation from motor 76, stopping rotation. Thus, the cycle is completed and the directional gyroscope 206 is now caged. For uncaging, contacts 2b are in deenergized position to supply excitation for relay 73 through the closed set of contacts of switch 77 to ground. The latter contacts remained closed upon termination of the caging cycle. Contacts 73a–b–c shown in Fig. 2 provide connection to a 24 volt source Z having in this instance a polarity opposite to that previously applied to motor 76, which now turns in the opposite direction until such time when the common contact member of switch 77 comes in proximity with the depressed end slope of cam 329, breaking the circuit continuity of relay 73 and stopping rotation of the motor. Momentarily prior to termination of motor rotation, the side opposite the apex of the triangular aperture 321 transmits a force to rod 327 counterclockwise of the device as shown in Fig. 1b positively effecting disengagement of caging cam 325 from caging pin 326. Thus, the uncaging cycle is now completed and the directional gyroscope 206 is now properly uncaged.

Hence, in the manner set forth above, the inventive gyroscope caging mechanism provides for positive caging and uncaging of a gyroscope in response to appropriate remote command signals. In a drone aircraft, the inner and outer gimbals of the gyroscope may be considerably angularly displaced therebetween as the result of flight maneuvers. Thus, the instant invention under such circumstances provides for positive caging irrespective of the flight attitude of the drone aircraft, tending to cause the angular displacement, and in addition, the caging is implemented without disengagement of the automatic pilot system in a manner such that the aircraft is gradually returned to a datum flight attitude without experiencing violent transitionary maneuvers. In response to an uncaging command signal, the inventive caging mechanism unlocks the gimbals providing for the normal functioning of the gyroscope.

It should be understood, of course, that the foregoing disclosure relates to only a preferred embodiment of the invention and that numerous modifications and alterations may be made therein without departing from the spirit and the scope of the invention as set forth in the appended claims.

What is claimed is:

1. In apparatus for remote control of pilotless aircraft including a gyroscope, a caging mechanism for remotely caging a gyroscope comprising a caging motor, means to actuate said motor in response to remote signals, a caging drum, means to rotate said caging drum in synchronism with said caging motor, said caging drum being cylindrical in shape including an aperture in said caging drum, and gyroscope caging means riding in said aperture.

2. The device of claim 1, said gyroscope caging means comprising a caging arm, a yoke straddling one end of said caging arm and connected thereto, an angle bracket attached to one arm of the yoke and pin receiving means in said angle bracket to engage a caging pin on a gimbal of a gyroscope.

3. The device of claim 2, said caging arm yoke having a pin mounted normal to the apex of said yoke and extending therefrom, the axis of said pin being mounted in a plane other than the plane of the longitudinal axis of said drum whereby rotation of said drum will simultaneously lift the caging arm into mating position of the bracket with the gimbal pin and cause the pin of the caging arm yoke to ride in the drum aperture.

4. The device of claim 1, said drum aperture being approximately triangular in shape to form a base and two sides, the base of the triangle being positioned normal to the gyroscope caging means thereby permitting the gyroscope caging means to be freely swingable when in position adjacent the base and to be held from swinging by the apex of said triangle when positioned adjacent said apex.

5. The device of claim 1, said cylindrical drum having a plurality of cam surfaces at one end, said cam surfaces comprising a first approximately sector shaped cam of radius larger than the cylinder radius, a second approximately sector shaped cam of radius larger than said first sector, said second sector cam being superimposed on a portion of said first sector cam and at one end thereof to form limit switch engaging surfaces.

6. The mechanism of claim 5 including a limit switch having contacts and a co-acting armature disposed in sliding contact with said surfaces, the contacts serving to disrupt the excitation means driving the caging motor to limit rotation of the drum by the motor within prescribed arcuate limits, a relay closing the circuit of said motor upon keying of selected operations to cause the motor circuit to be completed, rotating the caging motor to drive the drum to rotate in a direction to cause caging of a gyroscope.

References Cited in the file of this patent

UNITED STATES PATENTS

| | | |
|---|---|---|
| 2,641,133 | Barkalow et al. | June 9, 1953 |
| 2,769,343 | Gongwer | Nov. 6, 1956 |
| 2,787,908 | Gabrielson | Apr. 9, 1957 |